United States Patent [19]
Shitanda et al.

[11] Patent Number: 5,336,935
[45] Date of Patent: Aug. 9, 1994

[54] ELECTRONIC PARTS MOUNTING APPARATUS

[75] Inventors: Motoshi Shitanda, Toyonaka; Takao Eguchi, Nishinomiya; Yuji Miyoshi, Neyagawa, all of Japan

[73] Assignee: Matsushita Electric Industrial Co., Ltd., Osaka, Japan

[21] Appl. No.: 11,826

[22] Filed: Feb. 1, 1993

Related U.S. Application Data

[63] Continuation of Ser. No. 615,011, Nov. 19, 1990, abandoned.

Foreign Application Priority Data

Nov. 17, 1989 [JP] Japan .................... 1-300437

[51] Int. Cl.$^5$ ...................... B23Q 17/24; B23P 21/00
[52] U.S. Cl. ...................... 307/116; 29/720; 29/760; 29/407; 29/721
[58] Field of Search .................. 29/407, 720, 721, 760; 340/870.28, 870.29; 307/116

[56] References Cited

U.S. PATENT DOCUMENTS

| | | | |
|---|---|---|---|
| 4,747,198 | 5/1988 | Asai et al. | 29/407 |
| 5,077,462 | 12/1991 | Newell et al. | 235/381 |

*Primary Examiner*—Jeffrey A. Gaffin
*Assistant Examiner*—Aditya Krishnan
*Attorney, Agent, or Firm*—Wenderoth, Lind & Ponack

[57] ABSTRACT

An electronic parts mounting apparatus includes a plurality of parallel parts feeder units each of which accommodates a plurality of electronic parts and sequentially feeds the electronic parts to a predetermined parts pickup position; the parts feeder units being arranged in parallel so as to form a parts feeding section; a positioning device for positioning a member on which the electronic parts are to be mounted; a parts mounting device which seizes each of the electronic parts at a predetermined position of the parts feeding section and which mounts each of the electronic parts on the member; and a detection device for detecting a distal end of each of the parts feeder units so as to determine whether a particular parts feeder unit deviates from a present position.

5 Claims, 3 Drawing Sheets

ELECTRONIC PARTS MOUNTING APPARATUS

This application is a continuation of patent application Ser. No. 07/615,011 filed Nov. 19, 1990 and now abandoned.

BACKGROUND OF THE INVENTION

The present invention relates to a parts mounting apparatus which is used for sucking, for example, an electronic part so as to mount the electronic part on a circuit board.

Conventionally, an electronic parts mounting apparatus for mounting electronic parts on a circuit board is well known in which a plurality of parts feeder units each accommodating a number of the electronic parts are mounted in parallel on a movable table movable in a direction of parallel mounting of the parts feeder units such that any electronic part accommodated in an arbitrary one of the parts feeder units can be picked up at a predetermined pickup position from the parts feeder unit. Meanwhile, the known electronic parts mounting apparatus is provided with a positioning means for positioning the supplied circuit board such that each electronic part is displaced to a predetermined mounting position on the circuit board. Furthermore, the known electronic parts mounting apparatus is provided with a parts mounting means which holds each electronic part at the predetermined pickup position and mounts each electronic part on the positioned circuit board at the predetermined mounting position.

In the known electronic parts mounting apparatus, when a number of the parts feeder units are mounted on the movable table for the purpose of not only coping with a case in which many kinds of the electronic parts are mounted on the single circuit board but reducing period required for replacing the parts feeder units at the time of change of kinds of the circuit boards so as to decrease lost time of replacement of the parts feeder units, the movable table is made larger in size. Therefore, a driving force of a drive means for displacing the movable table is also required to be increased and an actuator is apt to be made larger in size partly for the purpose of driving the movable table at high speed. Furthermore, the known electronic parts mounting apparatus has such a drawback that a ball screw is made larger in length and is expanded due to generation of heat of the actuator, thereby resulting in inaccurate positioning of the table.

SUMMARY OF THE INVENTION

Accordingly, an essential object of the present invention is to provide an electronic parts mounting apparatus which eliminates the above described disadvantages inherent in conventional electronic parts mounting apparatuses.

In order to accomplish this object of the present invention, an electronic parts mounting apparatus according to the present invention comprises: a plurality of parts feeder units each of which accommodates a plurality of electronic parts so as to sequentially feed the electronic parts to a predetermined parts pickup position; said parts feeder units being arranged in parallel so as to form a parts feeding section; a member on which the electronic parts are mounted; a positioning means for positioning said member; a parts mounting means which holds each of the electronic parts at a predetermined position of said parts feeding section so as to mount each of the electronic parts on said member; and a detection means for detecting positional deviation of a distal end of each of said parts feeder units from a preset position of each of said parts feeder units.

In accordance with the present invention, since positional deviation of the distal end of each of a plurality of the parts feeder units arranged on the table can be detected, accuracy for positioning the electronic parts on the circuit board can be improved.

BRIEF DESCRIPTION OF THE DRAWINGS

This object and features of the present invention will become apparent from the following description taken in conjunction with the preferred embodiment thereof with reference to the accompanying drawings, in which.

DETAILED DESCRIPTION OF THE INVENTION

Figure 1:
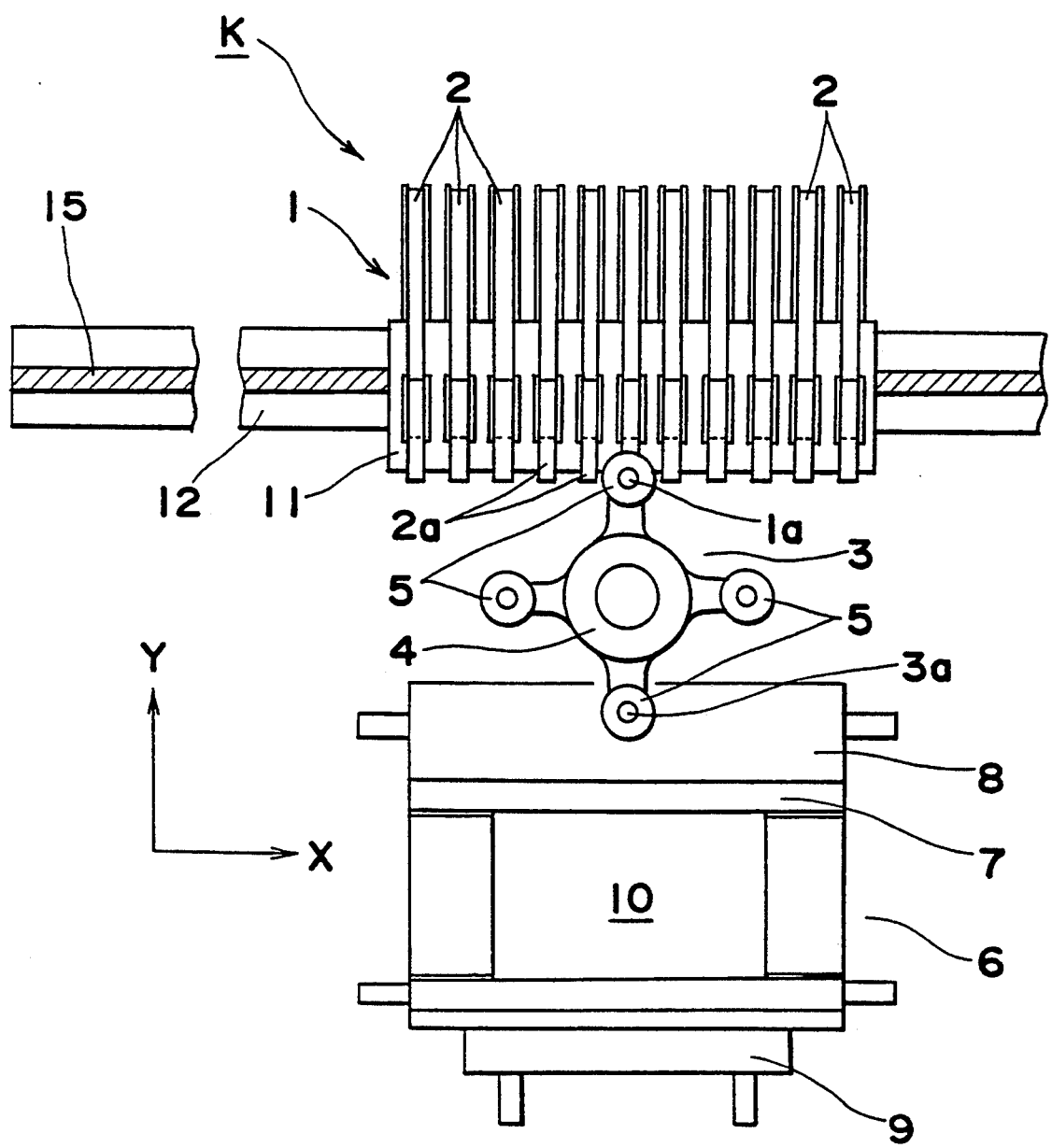
FIG. 1 is a top plan view of an electronic parts mounting apparatus according to one embodiment of the present invention.
Figure 2:
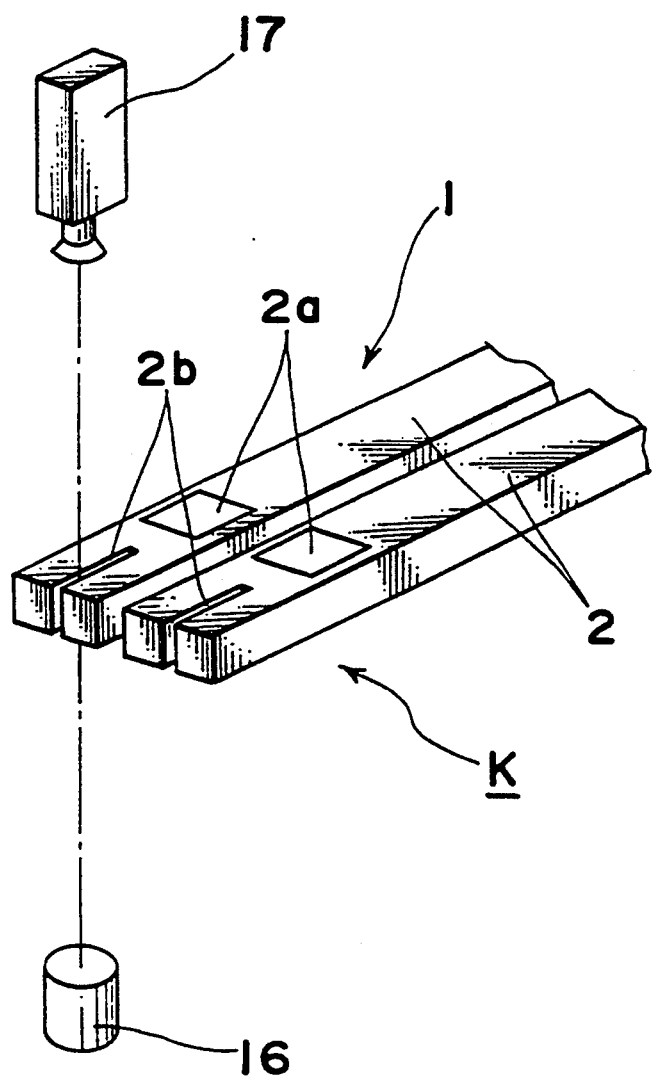
FIG. 2 is a fragmentary perspective view of the electronic parts mounting apparatus of FIG. 1.

Referring now to the drawings, there is shown in FIGS. 1 and 2, an electronic part mounting apparatus K according to one embodiment of the present invention. In FIG. 1, the apparatus K has a parts feeding section 1 in which a number of parts feeder units 2 are arranged in parallel such that an arbitrary one of the parts feeder units 2 can be positioned at a predetermined parts feeding position 1a. An assembly of a number of tapelike parts held in a line is mounted on each of the parts feeder unit 2 such that the parts can be sequentially fed to a parts pickup position 2a disposed at one end portion of each parts feeder unit 2.

The apparatus K further includes a rotational type parts mounting unit 3. In the parts mounting unit 3, a plurality of, for example, four mounting heads 5 are provided at an equal interval on a rotary table 4 rotatable intermittently about a fixed axis. The rotary table 4 is intermittently rotated at the interval of the mounting heads 5, i.e. 90° in FIG. 1 such that two of the mounting heads 5 are set at the parts feeding position 1a and a parts mounting position 3a, respectively. Each mounting head 5 is provided with a suction nozzle (not shown) movable vertically. At the parts feeding position 1a, the suction nozzle is lowered so as to suck the part and then, is lifted. Subsequently, at the parts mounting position 3a, the suction nozzle is lowered so as to mount the part on a circuit board 10 by cancelling sucking of the part and then, is lifted.

A positioning unit 6 is provided for positioning the circuit board 10 on which the parts are to be mounted. In the positioning unit 6, a fixing means 7 for securing at a predetermined position on an X-axis table 8, the circuit board 10 supplied by a supply means (not shown) is provided on the X-axis table 8. The X-axis table 8 is movable in the direction of the arrow X and is provided on a Y-axis table 9 movable in the direction of the arrow Y. Thus, an arbitrary portion of the circuit board 10 secured to the X-axis table 8 by the fixing means 7 can be positioned at the parts mounting position 3a.

Hereinbelow, the parts feeding section 1 is described in detail with reference to FIG. 2. A plurality of the parts feeder units 2 are arranged in parallel on a movable table 11 of FIG. 1. The movable table 11 is driven by a ball screw 15 mounted rotatably on a guide frame 12. In the vicinity of the parts pickup position 2a disposed at the distal end of each parts feeder unit 2, each parts feeder unit 2 is formed with a slit 2b. A light emitting member 16 is provided below the slit 2b and a monitor camera 17 is provided above the slit 2b such that deviation of the parts feeder unit 2 from a predetermined position is detected by the light emitting member 16 and the monitor camera 17. The light emitting member 16 and the monitor camera 17 may be disposed vertically reversely.

Figure 3:
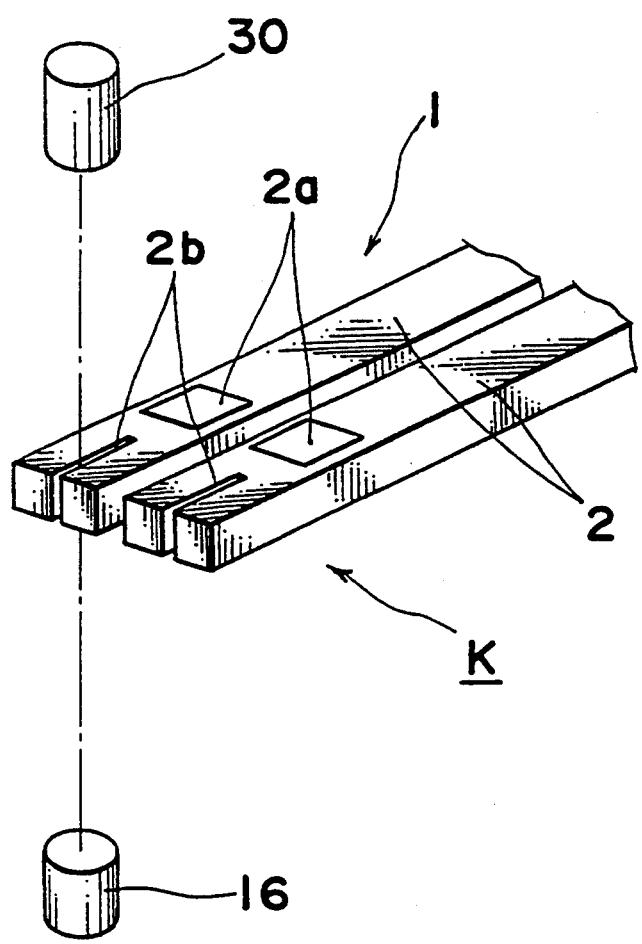
FIGS. 3 and 4 are views similar to FIG. 2, particularly showing first and second modifications thereof, respectively.

Meanwhile, as shown in FIG. 3, a photosensor 30 may be employed in place of the monitor camera 17 and the parts pickup position 2a is displaced to a predetermined location by controlling the movable table 11 such that maximum quantity of light emitted by the light emitting member 16 passes through the slit 2b.

Figure 4:
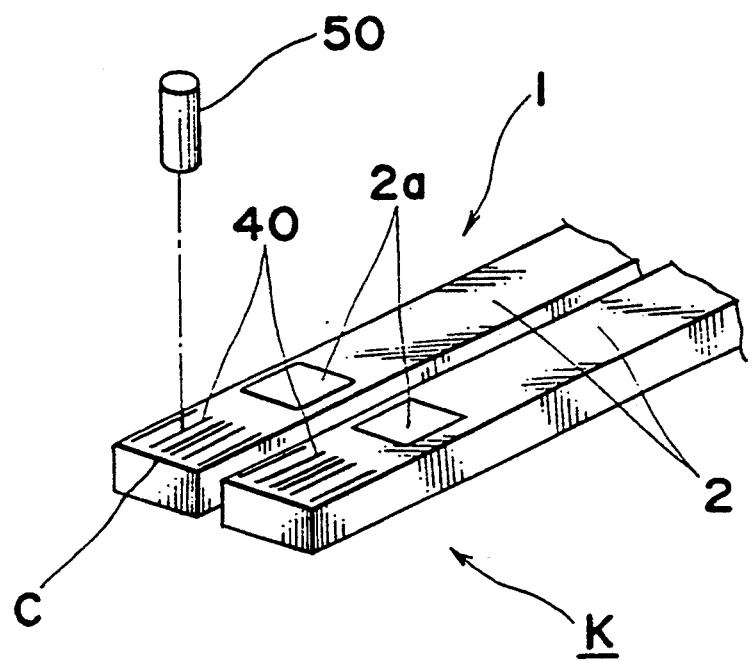

Alternatively as shown in FIG. 4, in the vicinity of the parts pickup position 2a disposed at the distal end of each parts feeder unit 2, bar codes 40 are marked on each parts feeder unit 2 in place of the slit 2b and are read by a bar code reader 50 such that deviation of the parts feeder unit 2 from the predetermined position is detected by the bar code 40 and the bar code reader 50. In this case, when the bar codes 40 are set such that intervals of the bar codes are reduced towards a lateral center C of each parts feeder unit 2, the movable table 11 is controlled such that the part is picked up at the time when a read value of the bar code reader 50 indicates a minimum interval of the bar codes 40.

Meanwhile, in the above embodiment, the electronic parts mounting apparatus has been described. However, it is needless to say that the present invention can be likewise applied to an electronic parts inserting apparatus.

Furthermore, it goes without saying that the present invention can be applied to an arrangement having a plurality of the movable tables 11. Meanwhile, an actuator may be provided on the movable table 11.

In accordance with the present invention, even if the movable table or the ball screw is deformed by thermal expansion, deviation of the parts feeder unit from the predetermined position can be detected easily. Thus, the movable table can be positioned highly accurately. Accordingly, even a minute chip can be sucked from the parts feeder unit accurately and thus, can be positioned on the circuit board highly accurately.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An electronic parts mounting apparatus comprising:

a parts feeding section including a plurality of parallel parts feeder units each having a distal end and adapted to accommodate a plurality of electronic parts and to sequentially feed the electronic parts to a predetermined parts pickup position defined thereon, and means for moving said feeder units to selectively position one of the parts feeder units at a predetermined parts feeding position;

positioning means for positioning a member which is to have electronic parts from said parts feeding section secured thereto;

parts mounting means for seizing an electronic part from the parts pickup position defined on the parts feeder unit located at said predetermined parts feeding position and for transferring the seized electronic part to a member positioned by said positioning means; and detection means for detecting the distal end of a said parts feeder unit at a predetermined location in the apparatus corresponding to said parts feeder unit being located precisely at said predetermined parts feeding position, said detection means including a slit defined in the distal end of each of said parts feeding units, and a light emitting member and a visual monitoring device disposed opposite one another across said predetermined location such that said visual monitoring member will receive light from said light emitting member through the slit in the distal end of a said parts feeding unit which is located precisely at said predetermined parts feeding position, whereby deviation of the distal end of said parts feeder unit from said predetermined location can be determined prior to said parts mounting means seizing an electronic part from the parts pickup position defined on the parts feeder unit located at said predetermined parts feeding position so that a positional deviation of said parts feeder unit from the parts feeding position can be eliminated.

2. An electronic parts mounting apparatus comprising:

a parts feeding section including a plurality of parallel parts feeder units each having a distal end and adapted to accommodate a plurality of electronic parts and to sequentially feed the electronic parts to a predetermined parts pickup position defined thereon, and means for moving said feeder units to selectively position one of the parts feeder units at a predetermined parts feeding position;

positioning means for positioning a member which is to have electronic parts from said parts feeding section secured thereto;

parts mounting means for seizing an electronic part from the parts pickup position defined on the parts feeder unit located at said predetermined parts feeding position and for transferring the seized electronic part to a member positioned by said positioning means; and detection means for detecting the distal end of a said parts feeder unit at a predetermined location in the apparatus corresponding to said parts feeder unit being located precisely at said predetermined parts feeding position, said detection means including a slit defined in the distal end of each of said parts feeding units, and a light emitting member and a photosensor disposed opposite one another across said predetermined location such that said photosensor will receive a maximum amount of light from said light emitting member through the slit in the distal end of a said parts feeding unit which is located precisely at said predetermined parts feeding position, whereby deviation of the distal end of said parts feeder unit from said predetermined location can be determined prior to said parts mounting means seizing an electronic part from the parts pickup position defined on the parts feeder unit located at said predetermined parts feeding position so that a positional deviation of said parts feeder unit from the parts feeding position can be eliminated.

3. An electronic parts mounting apparatus comprising:
   a parts feeding section including a plurality of parallel parts feeder units each having a distal end and adapted to accommodate a plurality of electronic parts and to sequentially feed the electronic parts to a predetermined parts pickup position defined thereon, and means for moving said feeder units to selectively position one of the parts feeder units at a predetermined parts feeding position;
   positioning means for positioning a member which is to have electronic parts from said parts feeding section secured thereto;
   parts mounting means for seizing an electronic part from the parts pickup position defined on the parts feeder unit located at said predetermined parts feeding position and for transferring the seized electronic part to a member positioned by said positioning means; and
   detection means for detecting the distal end of a said parts feeder unit at a predetermined location in the apparatus corresponding to said parts feeder unit being located precisely at said predetermined parts feeding position, said detection means including bar codes on each of the distal ends of said parts feeding units, and a bar code reader positioned in the apparatus to read the bar code of a said parts feeding unit positioned at said predetermined parts feeding position, whereby deviation of the distal end of said parts feeder unit from said predetermined location can be determined prior to said parts mounting means seizing an electronic part from the parts pickup position defined on the parts feeder unit located at said predetermined parts feeding position so that a positional deviation of said parts feeder unit from the parts feeding position can be eliminated.

4. An electronic parts mounting apparatus as claimed in claim 3, wherein said bar codes each include a plurality of spaced apart bars, intervals between the bars decreasing toward a lateral center of the distal end of each of the parts feeding units.

5. An electronic parts mounting apparatus comprising:
   a parts feeding section including a plurality of parallel parts feeder units each having a distal end and a mark at the distal end, and each of said parts feeder units adapted to accommodate a plurality of electronic parts and to sequentially feed the electronic parts to a predetermined parts pickup position defined thereon, and means for moving said feeder units to selectively position one of the parts feeder units at a predetermined parts feeding position;
   positioning means for positioning a member which is to have electronic parts from said parts feeding section secured thereto;
   parts mounting means for seizing an electronic part from the parts pickup position defined on the parts feeder unit located at said predetermined parts feeding position and for transferring the seized electronic part to a member positioned by said positioning means; and
   detection means for detecting the mark at the distal end of a said parts feeder unit at a predetermined location in the apparatus corresponding to said parts feeder unit being located precisely at said predetermined parts feeding position, whereby deviation of the distal end of said feeder unit from said predetermined location can be determined prior to said parts mounting means seizing an electronic part from the parts pickup position defined on the parts feeder unit located at said predetermined parts feeding position.

* * * * *